United States Patent Office 3,117,998
Patented Jan. 14, 1964

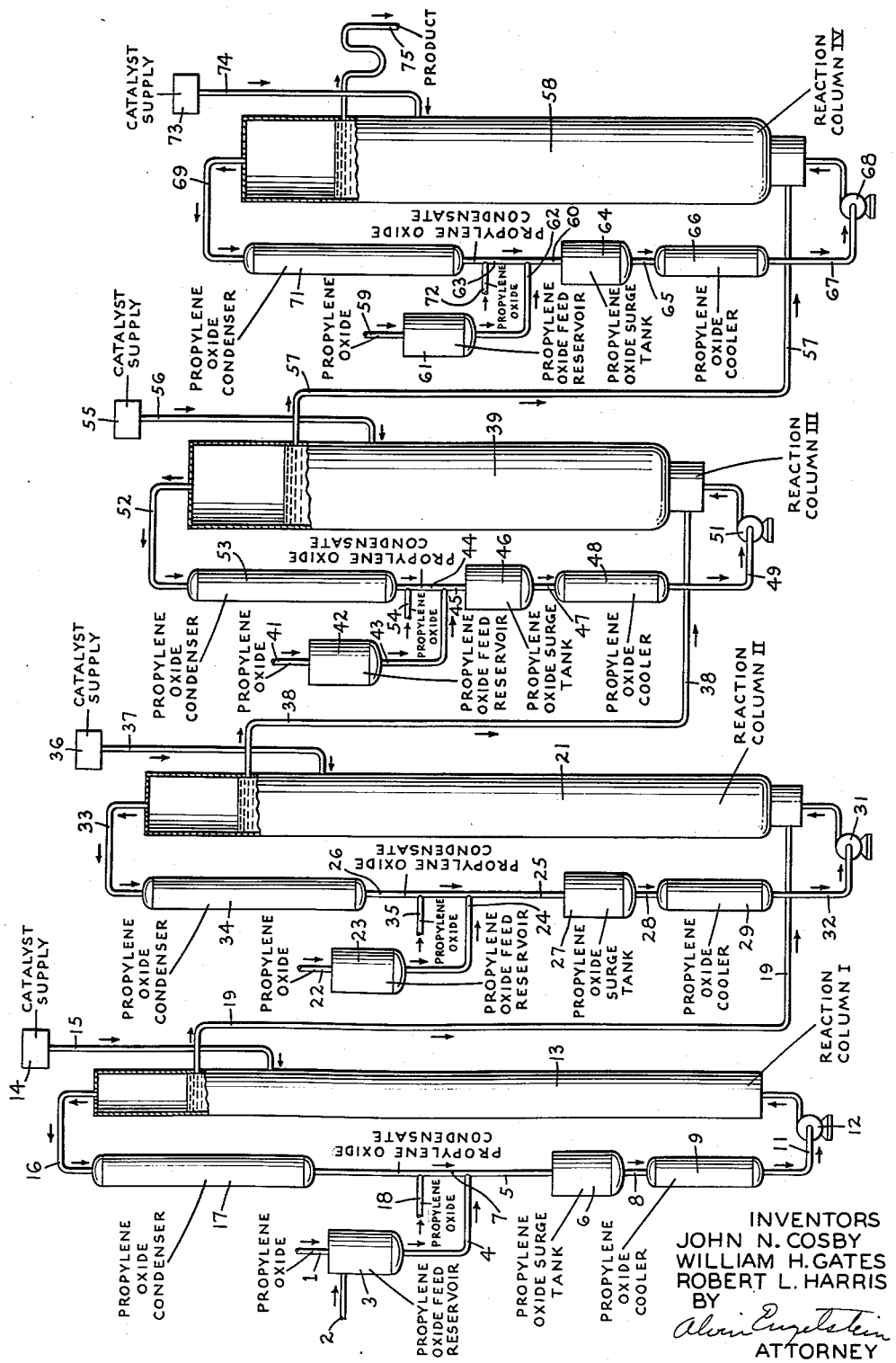

3,117,998
PROPYLENE OXIDE POLYETHERS
John N. Cosby, Morris Township, Morris County, William H. Gates, Whippany, and Robert L. Harris, Morris Township, Morris County, N.J., assignors to Allied Chemical Corporation, New York, N.Y., a corporation of New York
Filed Apr. 14, 1959, Ser. No. 806,331
6 Claims. (Cl. 260—584)

This invention relates to the production of polyethers and more particularly refers to a new and improved continuous process for the manufacture of propylene oxide polyethers especially adapted for use in the production of urethane foams.

The production of polyethers was known for more than twenty-five years and during that period has attained an ever-increasing importance with present annual production of millions of pounds of polyether. Despite advanced knowledge in the art, virtually all, if not all, commercial manufacture of polyethers is accomplished by the inefficient "batch" operation wherein a fixed volume is heated in a large kettle, rather than a modern economical method of continuously subjecting a flowing stream of charging materials under conditions to effect the desired polymerization and continuously withdrawing the polymer product. A difficulty in the operation is the formation of unwanted by-products such as excessive amounts of high and low molecular weight constituents, colored bodies, unsaturated compounds and cross-linked compounds which detrimentally affect the properties and quality of the polyethers to render them unsuitable for the intended purpose or to require such extensive purification and rectification as to make the cost high. Polyethers are used in hydraulic brake fluids, lubricants, surface-active materials and are of particular importance in the production of urethane foams. The standard of purity of polyethers for use in urethane foams is appreciably higher than for other commercial uses which places a greater burden on the process of manufacturing the polyethers. A property of considerable importance in polyethers for use in polyurethane foam is the molecular weight distribution of the polyether and if there be too high a percentage of molecular constituents deviating from the desired average molecular weight the polyethers will be unsatisfactory for production of polyurethane foams.

The conversion of an alkene oxide to polyether is a progressive reaction undergoing stages of molecular arrangement influenced by the nature, proportion of reactants, catalyst, time and temperature. Attempts to transform the batch operation for the production of polyethers to a continuous method of operation resulted in the production of a polyether product of inferior quality unsuitable for use in polyurethane foam. This is our experience and apparently the experience of prior investigators and is understandable when one considers the many factors and variables which materially affect not only the quality but also the efficiency of the operation. Consequently, despite the limitation of efficiency inherent in the batch process the only method commercially utilized for producing polyethers was the batch process.

One object of the present invention is to provide an efficient, continuous process for producing propylene oxide polyethers of high quality eminently suitable for use in urethane foams.

Another object of this invention is to provide an improved process of regulating reaction conditions in a process for converting propylene oxide into propylene oxide polyethers.

A further object of the invention is to provide a flexible, efficient, continuous process for the production of propylene oxide polyethers of uniform quality at lower operating and capital costs.

Further objects and advantages will be apparent from the description and accompanying drawing.

In accordance with the present invention propylene oxide polyethers of high quality eminently suitable for the production of urethane foams may be produced efficiently and economically in a unitary continuous operation under controlled conditions of operation involving at least three stages and desirably not more than six stages, preferably four stages, wherein at least 85%, preferably all, of the entire polyol initiator such as propylene glycol, triethanolamine, ethylene glycol, glycerol, trimethylolethane, preferably propylene glycol, utilized as a reactant in the entire system and propylene oxide are continuously introduced into a first stage vertical column containing liquid reaction products resulting from the reaction of 6–12 mols propylene oxide with one mol polyol initiator at a point near the bottom of the column, said column containing an alkaline alkali metal compound catalyst such as KOH and NaOH catalyst, preferably KOH, dispersed therein, maintaining the concentration of alkaline alkali metal compound catalyst in the liquid in the column within the range of 0.1–1%, preferably 0.3–0.6%, by weight of the column of liquid, maintaining the temperature of the column within the range of 100–150° C., preferably within the range of 110–140° C., introducing said propylene oxide feed to said first stage column of reactants in at least 25%, preferably 50–150%, excess of 6–12 mols propylene oxide per mole of polyol initiator, effecting reaction of the 6–12 mols propylene oxide with the initiator in the column with the excess propylene oxide passing unreacted in vapor form upwardly through the column to effect agitation and intimate contact of the reactants therein, releasing unreacted propylene oxide vapor from the top of the column, condensing propylene oxide vapor, recirculating said propylene oxide condensate, continuously withdrawing reaction products from the upper portion of the first column, continuously passing the withdrawn reaction products into the lower portion of a second column similar to the first column but larger in volumetric capacity and containing liquid reaction products resulting from the reaction of 12–24 mols propylene oxide with one mol polyol initiator, maintaining the concentration of alkaline alkali metal compound catalyst dispersed in the second column within the range of 0.1–1%, preferably 0.1–0.6%, by weight of the second column of liquid maintaining the temperature of the second column within the range of 100–150° C., preferably within the range of 110–140° C., introducing propylene oxide feed at a point near the bottom of the second column of liquid in an amount of at least 25%, preferably 50–150%, excess of 6–12 mols propylene oxide per mol of reaction product fed into the second column, effecting reaction of the 6–12 mols propylene oxide with the reaction product in the second column with the excess propylene oxide passing unreacted in vapor form upwardly through the column to effect agitation and intimate contact of the reactants therein, releasing unreacted propylene oxide vapor from the top of the second column, condensing propylene oxide vapor, recirculating said propylene oxide condensate, continuously withdrawing reaction products from the upper portion of the second column, continuously passing the withdrawn reaction products into the lower portion of a third column similar to the second column but larger in volumetric capacity and containing liquid reaction products resulting from the reaction of 24–36 mols propylene oxide with one mol polyol initiator, maintaining the concentration of alkaline alkali metal compound catalyst dispersed in the third column within the range of 0.1–1%, preferably 0.1–0.6%, by weight of the third column of liquid, maintaining the temperature of the third column within the range of 100–150° C., preferably within the range of 110–140° C., introducing propylene oxide feed at a point near the bottom of the third column of liquid in an amount of at least 25%, preferably 50–150%, excess of 6–12 mols propylene oxide per mol of reaction product fed into the third column, effecting reaction of the 6–12 mols propylene oxide with the reaction product in the third column with the excess propylene oxide passing unreacted in vapor form upwardly through the column to effect agitation and intimate contact of the reactants therein, releasing unreacted propylene oxide vapor from the top of the third column, condensing propylene oxide vapor, recirculating said propylene oxide condensate, and continuously withdrawing reaction products from the upper portion of the third column.

The base-catalyzed addition of propylene oxide to an active hydrogen-containing initiator proceeds through a nucleophilic attack on the epoxide group.

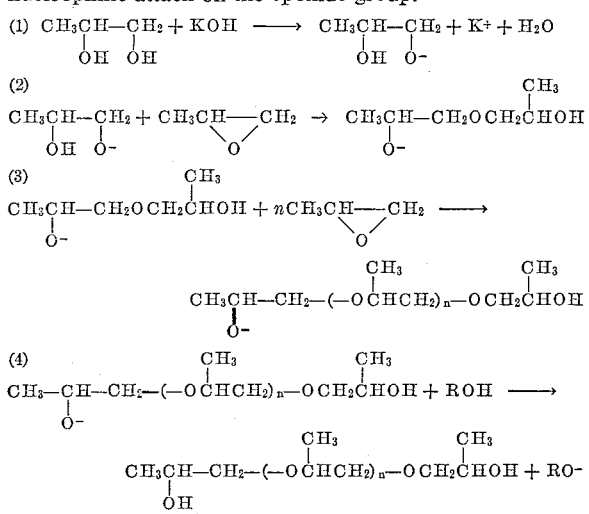

Reaction 1 represents the initiation reaction and Reactions 2 and 3 are propagation steps in the growth of the polymer chain. In Reaction 4 growth of the polymer chain is terminated by transfer to another active hydrogen-containing substance. However, it should be emphasized that the polymer molecule may start growing again as long as sufficient propylene oxide and catalyst are present. Termination may also occur by exhaustion of the propylene oxide reactant, neutralization, etc.

The initial reaction rate of propylene oxide with initiator, e.g., propylene glycol, triethanolamine, or similar primary hydroxyl compound, is greater than the reaction rates of the subsequent polymerization steps. For a given temperature the rate of propylene oxide consumption (mol basis) for the subsequent steps does not change with molecular weight, e.g., the reaction rate of 2000 molecular weight polypropylene glycol with propylene oxide is approximately equal to the reaction rate of 1000 molecular weight polypropylene glycol with propylene oxide. If, in a four-stage continuous polymerization, the reactors are graded in size in such manner that approximately the same number of mols of polyether is accommodated in each, the propylene oxide consumption will be very nearly equal in all reactors except for the first reactor. For convenience, the rate in the first reactor can be reduced to the rate of the subsequent reactors by using a lower temperature, a reduced propylene oxide feed rate or withholding the catalyst fed to the first reactor for addition to subsequent reactors. The reaction rate can be readily controlled by regulation of the temperature. The rate at 140° C. is approximately twice the rate at 120° C.; the rate at 160° C. is approximately twice the rate at 140° C. Product color and quality limit the preferred upper temperature limit to 150° C. Economic considerations limit the preferred lower temperature limit to 100° C.

The accompanying drawing is a diagrammatic flow sheet illustrating a four-stage operation of the process of the present invention.

In the drawing, the reactants propylene oxide and reaction initiator are introduced through lines 1 and 2 respectively into propylene oxide feed reservoir 3. The mixture of propylene oxide and reaction initiator flows downwardly through lines 4 and 5 into propylene oxide surge tank 6 into which is also introduced propylene oxide condensate flowing down through lines 7 and 5 into tank 6. The resultant mixture passes down through line 8 into propylene oxide cooler 9 wherein additional cooling is provided, as for example, indirect contact with cold water to insure that the temperature of the propylene oxide is sufficiently low to avoid vaporization. The liquid mixture of reactants and recycled propylene oxide condensate are withdrawn from cooler 9 via line 11 and forced by pump 12 into the bottom of reaction column I. The reaction column is suitably an elongated vertical, cylindrical chamber having a height approximately fifteen to thirty times the diameter to provide sufficient contact time for the desired reaction. Although the reaction of propylene oxide with reaction initiator is exothermic, generally it has been found necessary to add additional heat to maintain the desired temperature of 100–150° C. of the liquid contents in reaction column I and for this purpose suitable heating means, not shown in the drawing, such as an electrical heating jacket or a heating jacket surrounding reaction column I through which flows a heating medium such as superheated steam or diphenyl may be provided. KOH catalyst may be fed from catalyst supply chamber 14 through line 15 into the body of liquid in reaction column I. Because solution is gradual catalyst need not be added continuously but may be added periodically, supported on a screen not shown in the drawing, in column 13. Catalyst dispersed throughout the body of liquid in column 13 is maintained at a concentration within the range of 0.1–1%, preferably 0.3–0.6%, by weight of the liquid contents of the column. In initiating the reaction, reaction column I is filled to a point near the top as shown by the liquid level line with polyether of the prescribed average molecular weight reserved from stock from a previous run or prepared by a batch operation. Merely as illustrative, 6–12 mols propylene oxide may be reacted in a batch operation with 1 mol of propylene glycol to produce the initial charging feed introduced into reaction column I for starting up the operation.

The propylene oxide and reaction initiator entering propylene oxide feed reservoir through lines 1 and 2 are fed in the proportion of 6–12 mols propylene oxide per mol reaction initiator. This feed flowing through line 4 commingles with unreacted propylene oxide condensate passing down through line 7 and the resultant mixture then passes through line 5, propylene oxide surge tank 6, line 8, propylene oxide cooler 9, line 11, and is forced by pump 12 into the bottom of the hot body of liquid polymer in column 13 wherein it vaporizes and the vapors pass upwardly through the reaction column. The reaction is controlled by the temperature and concentration of catalyst to effect the reaction of 6–12 mols propylene oxide per mol of initiator leaving excess propylene oxide passing up through and out of the column unreacted. Samples of the reaction product in the reaction column I may be periodically withdrawn and tested to make certain the contents are of the desired average molecular weight. The purpose of providing excess propylene oxide under conditions wherein it remains unreacted is to agitate the reaction contents and facilitate the reaction, thereby making mechanical stirrers unnecessary and simplifying the operation. Unreacted propylene oxide vapor is released from the top of reaction column I, through line 16, condensed in propylene oxide condenser 17, and the propylene oxide condensate returned through lines 7, 5 to the bottom of column 13. The amount of propylene oxide condensate recycled should be at least 25%, preferably 50–150%, by weight of the propylene oxide feed introduced through line 4. During reactor start-up the excess propylene oxide may be introduced through line 18, passing down through lines 7 and 5 and after equilibrium conditions have been attained, additional excess propylene oxide need not be added.

The liquid reaction products are withdrawn near the top of column 13 through line 19 and sent to the bottom of column 21, designated reaction column II, similar in construction to reaction column I except that it has an appreciably larger volumetric capacity, usually of the order of 1½ to 2½ times the capacity of the first reaction column. Here again, in initiating the reaction, reaction column II is filled with a polyether polymer product reserved from a previous operation or produced in a batch operation by reacting 1 mol of initiator with 12–24 mols propylene oxide. Additional propylene oxide is introduced through line 22 into propylene oxide feed reservoir 23 and the propylene oxide fed to the system through lines 24 and 25 at the rate of 6–12 mols propylene oxide per mol of reaction initiator introduced through line 2, preferably at substantially the same rate, i.e., within about 20% of the feed of propylene oxide, to reaction column I. All or substantially all, of the reaction initiator utilized in the system, i.e., more than 85% of the reaction initiator utilized in the system, is introduced in the first stage reaction through line 2 and therefore little, preferably none, of the reaction initiator is introduced in the second or subsequent stages. The operation and construction of the second stage unit is generally similar to the first stage with propylene oxide feed flowing through line 24, commingling with propylene oxide condensate entering through line 26 and the mixture passing through line 25 into propylene oxide surge tank 27, thence through line 28 into propylene oxide cooler 29 from which it is forced by pump 31 through line 32 into the bottom of reaction column 21. The propylene oxide entering the hot column of liquid reaction product maintained at a temperature of 100–150° C. vaporizes and during its passage upwardly through the column of liquid reacts with the polymer to increase its chain length and molecular weight, the reaction being controlled by the temperature and concentration of catalyst to effect reaction of 6–12 mols propylene oxide per mol of polymer. Unreacted propylene oxide vapor is released from the top of reaction column II through line 33, condensed in propylene oxide condenser 34, and the propylene oxide condensate recirculated through line 26. During reactor start-up excess propylene oxide may be introduced into the system through line 35. The catalyst concentration dispersed in column 21 may be maintained by the introduction of KOH from catalyst supply chamber 36, passing down through line 37 into reaction column II. Periodically, samples may be withdrawn from column 13 to determine the average molecular weight to insure control of reaction conditions.

Reaction product from column 13 is continuously withdrawn from the top of the column and passed through line 38 into the bottom of column 39, designated reaction column III. The construction and operation of the third-stage unit is generally similar to that of stages one and two and involves introducing propylene oxide through line 41 into propylene oxide feed reservoir 42, flowing the propylene oxide through line 43 at the rate of 6–12 mols propylene oxide per mol of reaction initiator introduced through line 2, commingling the propylene oxide with propylene oxide condensate passing through line 44, and passing the mixture through line 45 into propylene oxide reservoir 46, thence through line 47, propylene oxide cooler 48, line 49 and pump 51 which forces the mixture into the bottom of reaction column III. Reaction column III has a larger volumetric capacity of the order of 1½ to 2½ times the volumetric capacity of reaction column II. To initiate the reaction, reaction column III is filled with polyether of the prescribed average molecular weight from stock reserved from a previous run or produced by a batch operation. Upon entering the bottom of the polymer in reaction column III maintained at a temperature of 100–150° C., the propylene oxide vaporizes and passes upwardly through the column, reacting with the polymer therein which reaction is controlled by regulating the temperature and catalyst concentration to react 6–12 mols propylene oxide per mol of polymer. Unreacted propylene oxide vapor is released from the top of reaction column III through line 52, condensed in propylene condenser 53 and recirculated via line 44 to reaction column 3. During reactor start-up propylene oxide may be introduced through line 54. Catalyst to maintain the concentration within reaction column III within the range of 0.1–1% may be added from catalyst supply chamber 55 through line 56.

Reaction product is continuously withdrawn from the top of reaction column III through line 57 and directed into the bottom of chamber 58 designated reaction column IV which has a volumetric capacity greater than reaction column III. The construction and operation of the fourth-stage operation is similar to the previous stages of operation and involves introducing propylene oxide through line 59 into propylene oxide feed reservoir 61, thence through line 62 at the rate of 6–12 mols propylene oxide per mol of propylene initiator introduced through line 1 and passed into line 60 wherein it commingles with propylene oxide condensate flowing through line 63 and the mixture introduced into propylene oxide surge tank 64 from which it passes through line 65, propylene oxide cooler 66, down through line 67 and pump 68 which forces it into the bottom of reaction column IV. To initiate the reaction, reaction column IV is filled with stock reserved from a previous run or prepared by batch operation. Propylene oxide vaporizes upon being introduced into the bottom of column 58, is maintained at a temperature of 100–150° C. and reacts as it passes upwardly through the column to form a higher molecular weight polyether product. Unreacted propylene oxide is released from the top of reaction column IV through line 69, condensed in propylene oxide condenser 71, and the propylene oxide condensate recirculated through line 63. During reactor start-up excess propylene oxide may be added through line 72. Catalyst to maintain the concentration within the range of 0.1–1% is introduced from catalyst supply chamber 73, through line 74 into column 58. The polyether product of the desired average molecular weight is continuously discharged through line 75.

In the production of propylene glycol initiated polyethers it is, of course, possible to replace all or part of the propylene glycol initiator that would be fed to reaction column I with an equivalent amount of water which will react with propylene oxide to form propylene glycol under the conditions present in the reactor. In fact, any moisture entering the reactors as a component of feed materials must be expected to lead to the formation of propylene glycol initiated polyether.

The continuous multi-stage operation of the present invention has the following characteristics:

(a) Continuous introduction of oxide reactant at each stage; continuous withdrawal of reaction product from each stage and its introduction into the next stage;
(b) Introduction of substantially the total quantity of initiator reactant at first stage;
(c) Introduction of fresh catalyst at first stage only or at each stage;
(d) Maintaining unreacted (excess) oxide in admixture with the reaction liquid in each stage;
(e) The stages are preferably equal in the sense that the increase in average molecular weight, or the molar amount of oxide which reacts is about the same in each stage. This result is obtained preferably by maintaining approximately the same temperature and molar residence-time conditions in all stages;
(f) Use of the gaseous form of the oxide as stirring or agitating means for the reaction liquid of each stage;
(g) The operation is preferably carried out in three to six stages.

The preparation of a polyurethane foam involves the formation of a "prepolymer" by the reaction of an excess of diisocyanate with polyether as illustrated in the equation below:

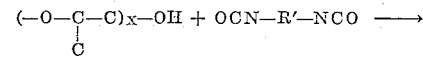

End of polyether chain    Diisocyanate

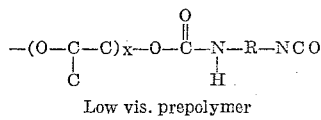

Low vis. prepolymer

Long heating or addition of a coupling agent such as trimethylolpropane induces cross-linking and results in an increase in viscosity. After adjusting the concentration of diisocyanate (approximate overall weight ratio—one diisocyanate to three polyether) water and an amine catalyst are beat into the viscous prepolymer. The action of the water is to produce gaseous carbon dioxide which produces the foam and give addition condensation of the polymer by the formation of urea linkages.

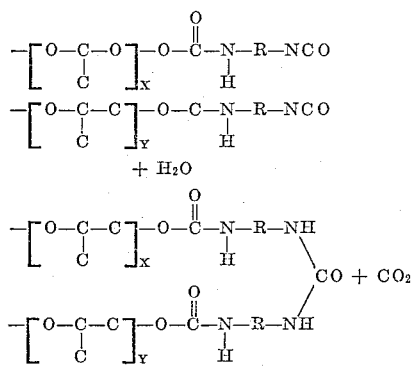

The density of the foam is related to the excess of isocyanate groups which release the carbon dioxide.

The following examples illustrate the present invention.

EXAMPLE 1

Apparatus substantially as illustrated in the drawing was employed with reaction columns I, II, III and IV having respctive operating capacities of 1.3, 2.28, 4.10 and 4.75. Each column was filled with previously prepared polyether of the prescribed average molecular weight—the first column containing polyether of molecular weight of 690; the second column molecular weight of 1220; the third column molecular weight of 1850 and the fourth column molecular weight of 2410. The reactors are brought to operating temperature of about 115° C. and the propylene oxide feed pump started. Pump rates are adjusted to provide 9.75 mols propylene oxide per mol of triethanolamine fed to reactor I which react in reactor I plus about 10 mols of excess propylene oxide which pass reactor I unreacted and is condensed and recycled. Propylene oxide reservoirs 23, 46 and 61 are reloaded as necessary with propylene oxide to provide reactant and excess propylene oxide; propylene oxide feed reservoir 3 is fed with a mixture of propylene oxide and the chain initiator, triethanolamine calculated to maintain a predetermined over-all propylene oxide:initiator ratio. Approximately 25% of the total propylene oxide is fed to reaction column I plus all the principal initiator.

Product from each reactor overflows into the succeeding reactor. Overflow from reaction column IV is the final product discharged from the system. KOH catalyst is added to each reactor to maintain the 0.4% catalyst concentration.

Process control is checked by periodic sampling of each of the four reactors and the resultant product. Sampling in the reactors is effected by siphoning off 60 ml. of reactor contents through a small tube extending to the midpoint of the column. Samples are analyzed for catalyst concentration and average molecular weight. The latter is determined by means of the hydroxyl number and checked by the viscosity. Low molecular values for a given reactor or set of reactors is corrected by increasing the temperature, or if indicated, by increasing the catalyst additions. The operating conditions for the run are summarized below:

*Continuous Production of Polyethers, Reaction Conditions*

```
Catalyst conc., percent KOH_____ 0.4
Temperature (all reactors)_____° C__ 115
Over-all PrO:TEA ratio_____ 39.1
Feed to R-1, PrO:TEA ratio_____ 9.75:1
```

| | Reactor Stage | | | |
|---|---|---|---|---|
| | R-1 | R-2 | R-3 | R-4 |
| Hydroxyl No. | 240 | 140 | 9.1 | 70 |
| Equivalents OH/kg. polyether | 4.30 | 2.50 | 1.62 | 1.25 |
| Molecular weight, avg | 690 | 1,220 | 1,850 | 2,400 |
| Residence time/hrs | 6.2 | 6.1 | 6.2 | 6.4 |

The yield of product collected from the overflow of reactor IV was about 97% and after treatment to remove residual KOH had the following properties:

```
Hydroxyl No. (mg. KOH/g.)_____ 70
Average molecular weight based on hydroxyl
  number _____ 2400
pH _____ 9.3
Viscosity, centipoises, 25° C_____ 420
Moisture, wt. percent _____ 0.05
Unsaturated by bromination, meq. unsaturation
  per gram _____ 0.08
Density, 20° C_____ 1.009
Ash, wt. percent_____ <0.001
```

The product was converted into excellent flexible urethane foams.

EXAMPLE 2

The operation was conducted in a manner similar to Example 1, the principal change being the use of propylene glycol as a reaction initiator instead of triethanolamine. A summary of the operating conditions is tabulated below:

*Propylene Glycol (PrG) Initiated Run*

```
Catalyst conc., percent KOH_____ 0.25
Temperature (all reactors)_____° C__ 120
Over-all PrO:PrG ratio_____ 41:1
Feed to R-1, PrO:PrG ratio_____ 10:1
```

| | Reactor Stage | | | |
|---|---|---|---|---|
| | R-1 | R-2 | R-3 | R-4 |
| Hydroxyl No. | 190 | 95 | 65 | 56 |
| Equivalents OH/kg. polyether | 3.40 | 1.70 | 1.16 | 1.00 |
| Molecular weight, avg | 590 | 1,180 | 1,820 | 2,000 |

The yield of product collected from the overflow of reactor IV was about 98% and after treatment to remove residual KOH had the following properties:

```
Hydroxyl No. (mg. KOH/g.)_____ 54
Average molecular weight based on hydroxyl
  number _____ 2080
pH _____ 6.5
Viscosity, centipoises, 25° C_____ 450
Moisture, wt. percent_____ 0.03
Unsaturated by bromination, meq. unsaturation
  per gram _____ 0.033
Density, 20° C_____ 1.005
Ash, wt. percent _____ <0.001
```

The product was converted to excellent flexible urethane foams.

Although certain preferred embodiments of the invention have been disclosed for purposes of illustration, it will be evident that various changes and modifications may be made therein without departing from the scope and spirit of the invention.

We claim:
1. A multi-stage continuous process for the production of high quality propylene oxide polyethers which comprises continuously introducing at least 85% of the entire polyhydroxy aliphatic compound initiator selected from the group consisting of propylene glycol, triethanolamine, ethylene glycol, glycerol and trimethylolethane utilized as a reactant in the system and propylene oxide into a first-stage vertical column containing reaction products resulting from the reaction of 6–12 mols propylene oxide with one mol of said polyhydroxy aliphatic compound initiator at a point near the bottom of the column, introducing an alkali metal hydroxide catalyst in the liquid in the column, maintaining the concentration of alkali metal hydroxide catalyst dispersed in the liquid in the column within the range of 0.1–1% by weight of the column of liquid, maintaining the temperature of the liquid in the column within the range of 100–150° C., introducing said propylene oxide feed to said first-stage column of reactants in excess of 6–12 mols propylene oxide per mol of said polyhydroxy aliphatic compound initiator, said excess propylene oxide being a quantity at least 25% in excess of the propylene oxide reacting in the first-stage column, effecting reaction of the 6–12 mols propylene oxide with the polyhydroxy aliphatic compound initiator in the column with the excess propylene oxide passing unreacted in vapor form upwardly through the column to effect agitation and intimate contact of the reactants therein, releasing unreacted propylene oxide vapor from the top of the column, condensing propylene oxide vapor, recirculating said propylene oxide condensate, continuously withdrawing reaction products from the upper portion of the first column, continuously passing the withdrawn reaction products into the lower portion of a second column similar to the first column but larger in volumetric capacity and containing reaction products resulting from the reaction of 12–24 mols propylene oxide with one mol of said polyhydroxy aliphatic compound initiator, maintaining the concentration of alkali metal hydroxide catalyst dispersed in the second column within the range of 0.1–1% by weight of the second column of liquid, maintaining the temperature of the liquid in the second column within the range of 100–150° C., introducing propylene oxide feed at a point near the bottom of the second column of liquid in excess of 6–12 mols propylene oxide per mol of reaction product fed into the second column, said excess propylene oxide being a quantity at least 25% in excess of the propylene oxide reacting in the second column, effecting reaction of the 6–12 mols propylene oxide with the reaction products in the second column with the excess propylene oxide passing unreacted in vapor form upwardly through the liquid in the second column to effect agitation and intimate contact of the reactants therein, releasing unreacted propylene oxide vapor from the top of the second column, condensing propylene oxide vapor, recirculating said propylene oxide condensate, continuously withdrawing reaction products from the upper portion of the second column, continuously passing the withdrawn reaction products into the lower portion of a third column similar to the second column but larger in volumetric capacity and containing liquid reaction products resulting from the reaction of 24–36 mols propylene oxide with one mol of said polyhydroxy aliphatic compound initiator, maintaining the concentration of alkali metal hydroxide catalyst dispersed in the liquid in the third column within the range of 0.1–1% by weight of the third column of liquid, maintaining the temperature of the third column of liquid within the range of 100–150° C., introducing propylene oxide feed at a point near the bottom of the third column of liquid in excess of 6–12 mols propylene oxide per mol of reaction product fed into the third column, said excess propylene oxide being a quantity at least 25% in excess of the propylene oxide reacting in the third column, effecting reaction of the 6–12 mols propylene oxide with the reaction products in the third column with the excess propylene oxide passing unreacted in vapor form upwardly through the column to effect agitation and intimate contact of the reactants therein, releasing unreacted propylene oxide vapor from the top of the third column, condensing propylene oxide vapor, recirculating said propylene oxide condensate, and continuously withdrawing reaction products from the upper portion of the third column the initial charge of reaction products in the first-stage column, second column and third column prepared under the operating conditions recited above for the respective columns.

2. A process as claimed in claim 1 wherein the alkali metal hydroxide catalyst is potassium hydroxide and wherein the concentration of catalyst dispersed in the liquid in the columns is within the range of 0.3–0.6 percent by weight of the columns of liquid and wherein the temperature of the liquid in the columns is maintained within the range of 110–140° C. and wherein said excess propylene oxide introduced into the columns of liquid is within the range of 50–150 percent.

3. A process as claimed in claim 1 wherein the alkali metal hydroxide catalyst is sodium hydroxide and wherein the concentration of catalyst dispersed in the liquid in the columns is within the range of 0.3–0.6 percent by weight of the columns of liquid and wherein the temperature of the liquid in the columns is maintained within the range of 110–140° C. and wherein said excess propylene oxide introduced into the columns of liquid is within the range of 50–150 percent.

4. A process as claimed in claim 1 wherein said initiator is propylene glycol.

5. A process as claimed in claim 1 wherein said initiator is triethanolamine.

6. A four-stage continuous process for the production of hight quality propylene oxide polyethers which comprises continuously introducing at least 85% of the entire triethanolamine initiator utilized as a reactant in the system and propylene oxide into a first-stage vertical column containing reaction products resulting from the reaction of 6–12 mols propylene oxide with one mol triethanolamine initiator at a point near the bottom of the column, introducing KOH catalyst in the liquid in the column, maintaining the concentration of KOH catalyst dispersed in the liquid in the column within the range of 0.3–0.6% by weight of the column of liquid, maintaining the temperature of the liquid in the column within the range of 110–140° C., introducing said propylene oxide feed to said first-stage column of reactants in excess of 6–12 mols propylene oxide per mol of triethanolamine initiator, said excess propylene oxide being a quantity 50–150% in excess of the propylene oxide reacting in the first-stage column, effecting reaction of the 6–12 mols propylene oxide with the triethanolamine initiator in the column with the excess propylene oxide passing unreacted in vapor form upwardly through the column to effect agitation and intimate contact of the reactants therein, releasing unreacted propylene oxide vapor from the top of the column, condensing propylene oxide vapor, recirculating said propylene oxide condensate, continuously withdrawing reaction products from the upper portion of the first column, continuously passing the withdrawn reaction products into the lower portion of a second column similar to the first column but larger in volumetric capacity and containing reaction products resulting from the reaction of 12–24 mols propylene oxide with one mol triethanolamine initiator, maintaining the concentration of KOH catalyst dispersed in the second column within the range of 0.3–0.6% by weight of the second column of liquid, maintaining the temperature of the liquid in the second column within the range of 110–140° C., introducing propylene oxide feed at a point near the bottom of the second column of liquid in excess of 6–12 mols propylene oxide per mol of reaction product fed into the second column, said excess propylene oxide being a quantity 50–150% in excess of the propylene oxide reacting in the second column, effecting reaction of the 6–12 mols propylene oxide with the reaction products in the second column with the excess propylene oxide passing unreacted in vapor form upwardly through the liquid in the second column to effect agitation and intimate contact of the reactants therein, releasing unreacted propylene oxide vapor from the top of the second column, condensing propylene oxide vapor, recirculating said propylene oxide condensate, continuously withdrawing reaction products from the upper portion of the second column, continuously passing the withdrawn reaction products into the lower portion of a third column similar to the second column but larger in volumetric capacity and containing liquid reaction products resulting from the reaction of 24–36 mols propylene oxide with one mol triethanolamine initiator, maintaining the concentration of KOH catalyst dispersed in the liquid in the third column within the range of 0.3–0.6% by weight of the third column of liquid, maintaining the temperature of the third column of liquid within the range of 110–140° C., introducing propylene oxide feed at a point near the bottom of the third column of liquid in excess of 6–12 mols propylene oxide per mol of reaction product fed into the third column, said excess propylene oxide being a quantity 50–150% in excess of the propylene oxide reacting in the third column, effecting reaction of the 6–12 mols propylene oxide with the reaction products in the third column with the excess propylene oxide passing unreacted in vapor form upwardly through the column to effect agitation and intimate contact of the reactants therein, releasing unreacted propylene oxide vapor from the top of the third column, condensing propylene oxide vapor, recirculating said propylene oxide condensate, continuously withdrawing reaction products from the upper portion of the third column, continuously passing the withdrawn reaction products into the lower portion of a fourth column similar to the third column but larger in volumetric capacity and containing liquid reaction products resulting from the reaction of 36–48 mols propylene oxide with one mol triethanolamine initiator, maintaining the concentration of KOH catalyst dispersed in the liquid in the fourth column within the range of 0.3–0.6% by weight of the fourth column of liquid, maintaining the temperature of the fourth column of liquid within the range of 110–140° C., introducing propylene oxide feed at a point near the bottom of the fourth column of liquid in excess of 6–12 mols propylene oxide per mol of reaction product fed into the fourth column, said excess propylene oxide being a quantity 50–150% in excess of the propylene oxide reacting in the fourth column, effecting reaction of the 6–12 mols propylene oxide with the reaction products in the fourth column with the excess propylene oxide passing unreacted in vapor form upwardly through the column to effect agitation and intimate contact of the reactants therein, releasing unreacted propylene oxide vapor from the top of the fourth column, condensing propylene oxide vapor, recirculating said propylene oxide condensate, and continuously withdrawing reaction products from the upper portion of the fourth column the initial charge of reaction products in the first-stage column, second column, third column and fourth column prepared under the operating conditions recited above for the respective columns.

References Cited in the file of this patent

UNITED STATES PATENTS

| | | |
|---|---|---|
| 2,392,158 | Lacey et al. | Jan. 1, 1946 |
| 2,554,667 | De Groote | May 29, 1951 |
| 2,663,699 | Bloem et al. | Dec. 22, 1953 |
| 2,674,619 | Lundsted | Apr. 6, 1954 |

FOREIGN PATENTS

| | | |
|---|---|---|
| 736,991 | Great Britain | Sept. 21, 1955 |
| 757,309 | Great Britain | Sept. 19, 1956 |